United States Patent [19]
Foster

[11] Patent Number: 5,921,859
[45] Date of Patent: Jul. 13, 1999

[54] VEHICLE SIDE WINDOW VENTILATOR AND METHOD OF USE

[76] Inventor: Darlene M. Foster, 960 Andrews Rd., Medina, Ohio 44256

[21] Appl. No.: 08/864,880

[22] Filed: Jun. 9, 1997

[51] Int. Cl.$^6$ ........................................................ B60J 1/20
[52] U.S. Cl. ............................................ 454/131; 296/154
[58] Field of Search ..................... 296/152, 154; 454/128, 131; 16/125

[56] References Cited

U.S. PATENT DOCUMENTS

| | | |
|---|---|---|
| 1,628,053 | 5/1927 | McTighe . |
| 4,558,633 | 12/1985 | Lingg . |
| 4,685,718 | 8/1987 | Steenblik et al. . |
| 4,756,242 | 7/1988 | Keith . |
| 4,923,241 | 5/1990 | Miller . |
| 5,177,834 | 1/1993 | Crist ........................................... 16/125 |
| 5,284,377 | 2/1994 | Krenciprock . |
| 5,360,048 | 11/1994 | Lauer ....................................... 156/86 |
| 5,525,105 | 6/1996 | Deary ...................................... 454/131 |

FOREIGN PATENT DOCUMENTS

| | | | |
|---|---|---|---|
| 2263119 | 10/1975 | France ................................... 454/128 |
| 2835394 | 2/1980 | Germany . |
| 159335 | 6/1979 | Netherlands . |
| 794922 | 5/1958 | United Kingdom . |
| 814284 | 6/1959 | United Kingdom ................... 296/154 |

*Primary Examiner*—D. Glenn Dayoan
*Assistant Examiner*—Chad D. Wells

[57] ABSTRACT

A window ventilator for use in connection with side automobile windows capable of being lowered and raised to create a variably sized gap between the top edge of the window and the window casing. The window ventilator is a flexible elongate member having opposed ends and an inner passageway, with at least one of the opposed ends having an opening in communication with the passageway. The elongate member is specifically adapted to fit in the gap between a window casing and a top edge of a side window when the same window is partially opened. A handle is secured to the elongate member to allow a user to place and remove the elongate member from the gap between the window casing and the top edge of the side window. With the elongate member filling the gap between the top edge of the window and the window casing, a gap is maintained between a leading edge of the window and the window casing. The size of the gap between the leading edge of the window and the window casing may be adjusted to regulate the rate of ventilation upon operation of the vehicle window, which may compress or relax the elongate member.

7 Claims, 3 Drawing Sheets

VEHICLE SIDE WINDOW VENTILATOR AND METHOD OF USE

BACKGROUND OF THE INVENTION

1. Field of the Invention

The present invention relates generally to automobile accessories and, more particularly, to a ventilator for automobile side windows.

2. Description of the Related Art

Weathershield accessories for automobiles are well known. Opening a vehicle's side window to introduce fresh, outside air into a vehicle and exhaust stale, inside air is desirable. This is particularly true if smoking occurs in the vehicle, in warm weather, or where weather conditions are such that the vehicle windshield would become foggy if the windows were up or closed. Weathershields allow the opening of a vehicle's side window without subjecting the occupants of the vehicle to adverse exterior weather conditions.

Most basic weathershields overhang the space above the window glass when the window glass is partially lowered. An example of such a basic weathershield is illustrated by British Patent No. 794,922 to Grys, published May 14, 1958. U.S. Pat. No. 4,685,718, issued to Lingg on Dec. 17, 1985, discloses a weathershield having its top edge attached to a retainer clip which is force fit into the window casing behind the rubber weatherstrip that typically is positioned within the casing. U.S. Pat. No. 4,685,718, issued to Steenblik et al. on Aug. 11, 1987, discloses a weathershield fashioned with a top edge that fits into the window casing, inside the rubber weatherstrip, thereby eliminating the need for connective hardware. U.S. Pat. No. 4,923,241, issued to Miller on May 8, 1990, discloses a weathershield having a downwardly angled front portion which overhangs the space in front of the window glass when the window glass is partially lowered in order to accommodate more recent vehicle window designs (where such a space is formed when the window glass is lowered). The downwardly angled front portion additionally provides wind deflection.

Vehicle window ventilators differ from weathershields by occupying the space above the window glass when the window glass is partially lowered rather than merely overhanging the space. Vehicle window ventilators allow the opening of a vehicle's side window without subjecting the occupants of the vehicle to wind, wind noise, or adverse exterior weather conditions. Some ventilators may be adjusted to regulate the rate of ventilation.

The following are examples of vehicle window ventilators: U.S. Pat. No. 1,628,053, issued to McTighe on May 10, 1927; U.S. Pat. No. 4,756,242, issued to Keith on Jul. 12, 1988; U.S. Pat. No. 5,284,377, issued to Krenciprock on Feb. 8, 1988; Netherlands Patent No. 159,335 to Schwartze in June 1979; and German Patent No. 2,835,394 to Splithoff in February 1980.

However, none of the related art devices are universal and able to fit within any vehicle window. Nor are they portable, extremely lightweight, and capable of being stored in a space with considerably smaller dimensions. Thus, none of the above inventions and patents, taken either singly or in combination, is seen to describe the instant invention as claimed.

SUMMARY OF THE INVENTION

The present invention is a portable vehicle window ventilator. According to one embodiment, the ventilator is a flexible, elongate member having opposed ends and an inner passageway with an opening at each of the opposed ends. According to a second embodiment, the ventilator is a flexible, elongate member having opposed ends and an inner passageway, with one of the opposed ends having an opening in communication with the passageway. Each elongate member is specifically adapted to fit in the gap between a vehicle side window casing and the top edge of a side window when the same window is partially opened. A handle is secured to the elongate member to allow a user to place and remove the elongate member from the gap between the window casing and the top edge of the side window. Depending on the size of the vehicle window, the elongate member can simply be cut to the appropriate length by using a pair of common scissors. The size of a gap in front of the elongate member between a leading edge of the window and the window casing may be adjusted to regulate the rate of ventilation upon operation of the vehicle window.

Accordingly, it is a principal object of the invention to provide a portable vehicle window ventilator which universally fits any vehicle side window.

It is another object of the invention to provide a window ventilator which may be adjusted to regulate the rate of ventilation upon operation of the vehicle window.

It is a further object of the invention to provide a window ventilator having a handle for aiding placement and removal thereof from a gap between the window casing and the side window.

Still another object of the invention is to provide a vehicle window ventilator capable of being compressed for storage in a space with considerably smaller dimensions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features is consistently throughout the attached drawings.

DETAILED DESCRIPTION OF THE PREFERRED EMBODIMENT

Figure 1:
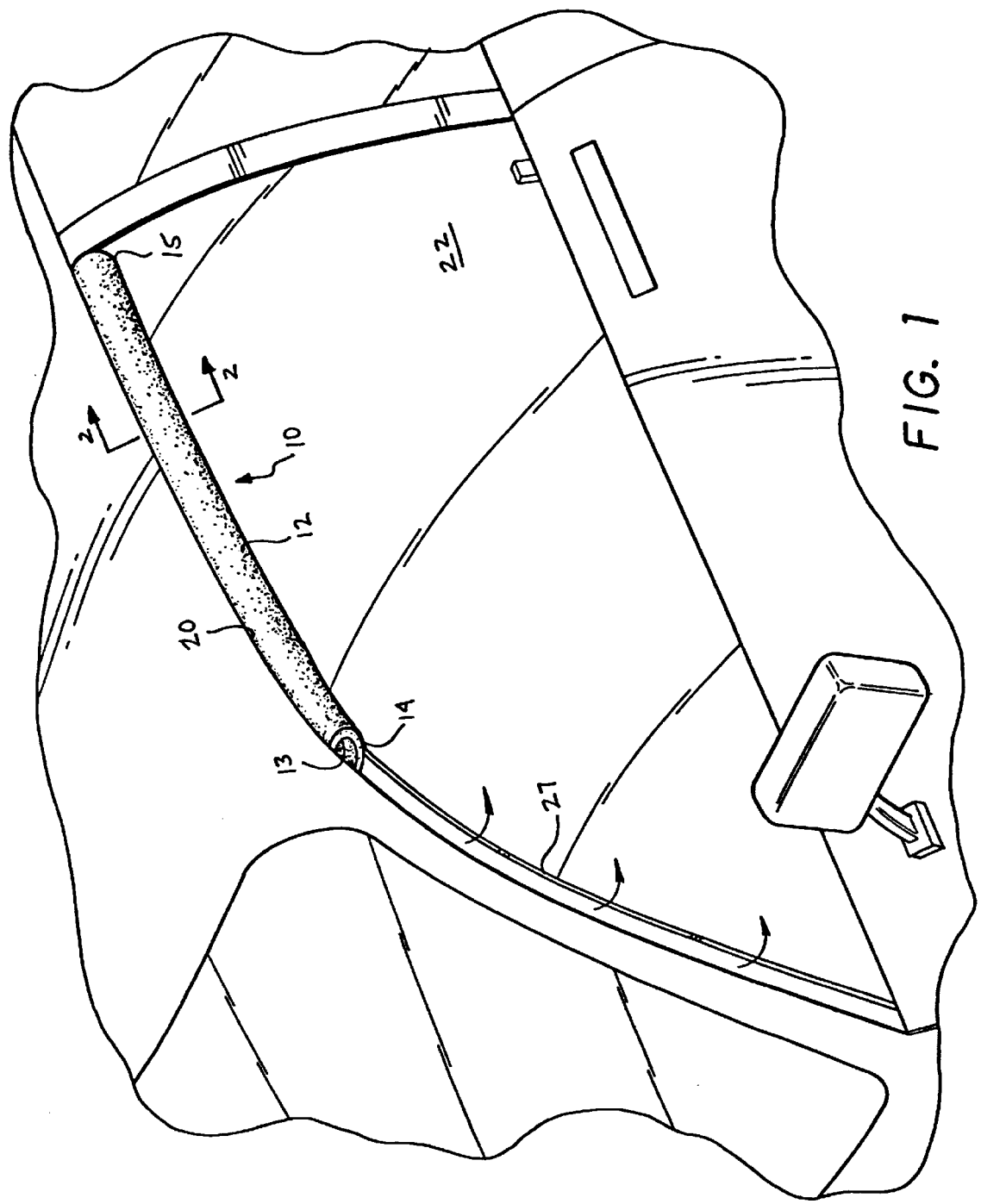
FIG. 1 is an environmental perspective view of a vehicle side window ventilator according to a first embodiment of the present invention which is shown positioned in between a side window and its window casing.

Referring now to the figures by numerals of reference and first to FIG. 1, a portable vehicle window ventilator 10 of the present invention is shown positioned for use in connection with a vehicle side window 22. The window ventilator 10 is specifically adapted to fit in a gap between a window casing 20 (typically having a weatherseal 23) and the side window 22 when the window is partially opened.

Figure 2:
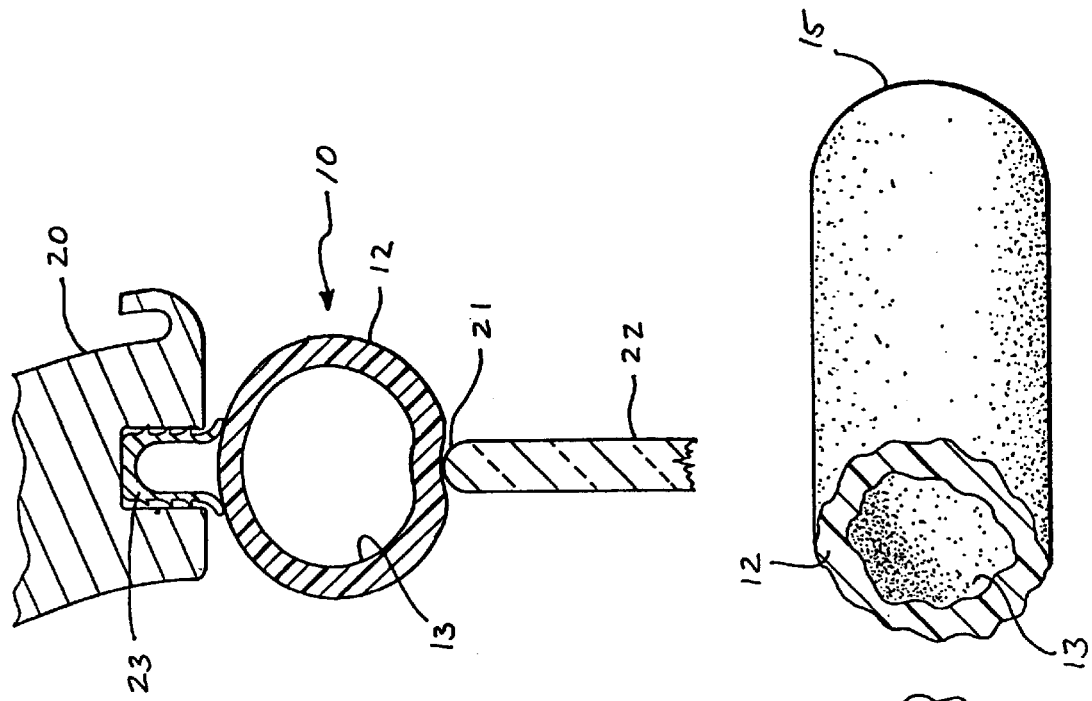
FIG. 2 is a cross-sectional view of the vehicle side window ventilator taken along line 2—2 in FIG. 1 and looking in the direction of the arrows.
Figure 3:
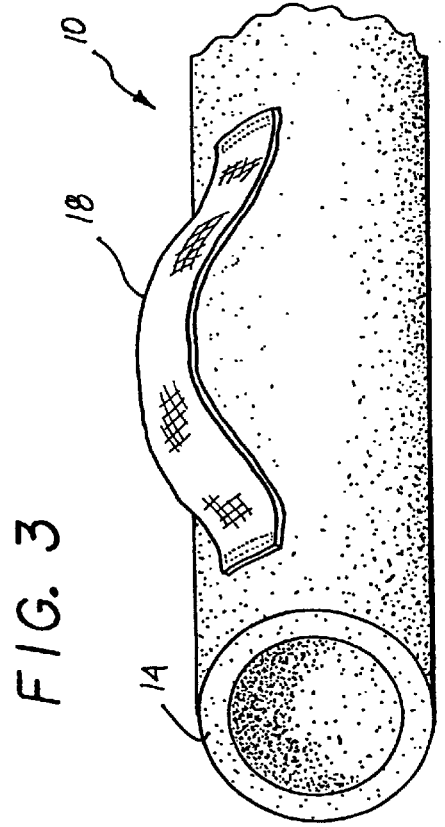
FIG. 3 is a perspective view of the first embodiment shown in FIG. 1.
Figure 4:
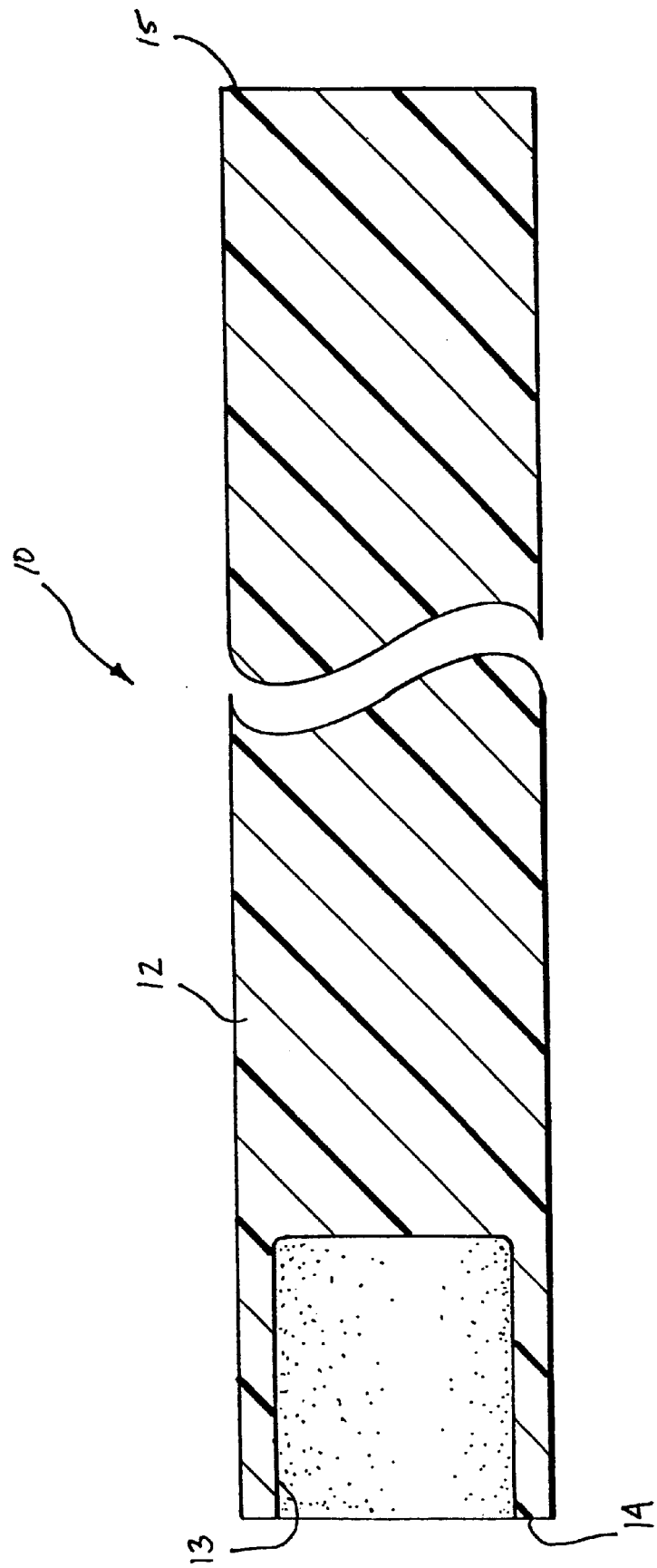
FIG. 4 is a sectional view along the length of a vehicle side window ventilator according to a second embodiment of the present invention.

Referring now to FIGS. 1–3, the window ventilator 10 comprises an elongate member 12 having opposed ends 14, 15 and an inner passageway 13 with an opening at each of the opposed ends. The elongate member 12 is formed of a resilient and compressible material such as a polyethylene foam; however, other polymeric materials also will suffice. In its preferred configuration, the elongate member 12 is substantially cylindrical, i.e., in the form of a tube. However, as will be apparent from the description hereinafter and as shown in FIG. 4, the passageway 13 need only extend a predetermined distance into one end thereof so that the same end may be placed in a direction facing the front of the vehicle. The predetermined distance which the passageway 13 extends into the elongate member 12 is at least approximately one inch, and more preferably at least approximately two inches. Depending on the size of the side window 22, the elongate member 12 can be cut to any appropriate length. To assist in the placement of the window ventilator 10 within the car window 22, the device is provided with a handle 18. The handle 18 is permanently secured to the elongate member 12 along a portion thereof by an adhesive or other like means.

To use the window ventilator 10, a user will first roll down the window 22 and insert the elongate member 12 into a gap formed between a top edge 21 of the window and the weatherseal 23 with the end 14 facing in a direction toward the front of the vehicle. With the elongate member 12 appropriately positioned (and maintained in such a position), the user will roll up the window to compress the elongate member. Upon compression of the elongate member 12, as shown in FIG. 2, the window ventilator 10 will be retained in such a position by frictional engagement between the top edge 21 of the window and the weatherseal 23. As shown in FIG. 1, the elongate member 12 should be positioned such that the end 15 thereof is placed against the rear portion of the door frame or window (depending upon the type and make of the vehicle). If the elongate member 12 has a passageway 13 extending the entire length thereof (as in FIGS. 1–3), then placement of the end 15 against the door frame will substantially seal the passageway to minimize or prevent the flow of air through the elongate member. Likewise, with use of a elongate member 12 having the passageway 13 extending a predetermined distance into the end 14 thereof (as in FIG. 4), the elongate member 12 is fabricated with its end 15 sealed to prevent the flow of air through the elongate member.

With the elongate member 12 positioned between the window casing 20 and the top edge 21 of the side window 22, a gap also is created between a leading or sloped edge 27 of the window and the window casing. This gap above the sloped edge 27 of the window allows ventilation to occur as air internal of the vehicle is drawn outside (indicated by the arrows shown in FIG. 1) through the same gap by the flow of air over the vehicle. The size of the gap above the leading edge 27 of the window and the window casing may be adjusted to regulate the rate of ventilation upon operation of the vehicle window. Thus, a smaller gap above the leading edge 27 will reduce the rate of ventilation and a larger gap above the leading edge 27 will maximize the rate of ventilation. To accommodate various size gaps, the elongate member 12 may be compressed or relaxed to a lesser or greater extent upon operation of the vehicle window 22.

In addition, the positioning of the elongate member 12 with its end 14 facing toward the front of the vehicle also reduces the likelihood of any precipitation (i.e., rain, sleet, or snow) from entering the interior of the vehicle through the gap above the sloped edge 27 of the window. Air flowing over the vehicle will contact the end 14 of the elongate member 12. Because air may not flow through the passageway 13, a burble is created before end 14. The turbulent air of the burble serves to disrupt the fall of precipitation, causing the precipitation to be directed away from the end 14 and external of the vehicle.

To remove the window ventilator 10 from its position intermediate the top edge 21 of the window 22 and the weatherseal 23, it is important that the user grasp the handle 18 before changing the height of the window. Once the device is supported, a user may simply roll down the window 22 and remove the window ventilator 10. Because the elongate member 12 is compressible, the device may easily be stored in any of a number of compact locations within the interior of a vehicle.

It is to be understood that the present invention is not limited to the sole embodiment described above, but encompasses any and all embodiments within the scope of the following claims.

I claim:

1. A vehicle window ventilator comprising:

a cylindrical member of resilient material, a handle on an outer surface of said cylindrical member, a cylindrical opening at one end of said cylindrical member, a closed bottom of said cylindrical opening at 1 to 2 inches from said one end;

said cylindrical member adapted to be placed between a retractable vehicle window and a vehicle window casing to be compressed to close a gap therebetween;

said vehicle window casing having a weatherseal and said cylindrical member having a width larger than a width of a weatherseal;

said cylindrical opening adapted to be placed at a forward location on said window to create turbulence as air travels over said open end.

2. The vehicle window ventilator according to claim 1, wherein said cylindrical member is cut to length.

3. The vehicle window ventilator according to claim 1, wherein said cylindrical member is formed of polyethylene foam.

4. A method of using a vehicle window ventilator comprising the steps of:

rolling down a side window to create a first gap between a top edge of the side window and a side window weatherseal, and a second gap between a sloped edge of the side window and the side window casing;

inserting the vehicle window ventilator into the first gap between the top edge of the side window casing, wherein the vehicle window ventilator comprises a cylindrical member of resilient material, a handle on an outer surface of said cylindrical member, a cylindrical opening at one end of said cylindrical member, a closed bottom of said cylindrical opening at 1 to 2 inches from said one end;

said cylindrical member adapted to be placed between the side vehicle window and the side vehicle window casing to be compressed to close a gap therebetween;

said side vehicle window casing having a weatherseal and said cylindrical member having a width larger than a width of the weatherseal;

said cylindrical opening adapted to be placed at a forward location on said window to create turbulence as air travels over said open end;

rolling up the side window until the top edge of the side window to slightly compresses the cylindrical member against the side window casing, the cylindrical member filling the first gap and maintaining the second gap.

5. The method of using the vehicle window ventilator according to claim 4, wherein said cylindrical member is cut to length.

6. The method of using the vehicle window ventilator according to claim 4, wherein said cylindrical member is formed of polyethylene foam.

7. The method of using the vehicle window ventilator according to claim 4, including the step of:

adjusting the distance between the top edge of the side window and the side window casing to adjust the size of the second gap.

\* \* \* \* \*